US008731397B2

(12) United States Patent
Zhang

(10) Patent No.: US 8,731,397 B2
(45) Date of Patent: May 20, 2014

(54) METHOD, SYSTEM AND DEVICE FOR SINGLE-FIBER BIDIRECTIONAL RING NETWORK PROTECTION

(75) Inventor: Junhui Zhang, Shenzhen (CN)

(73) Assignee: ZTE Corporation, Shenzhen, Guangdong Province ( * ) Notice: Subject to any disclaimer, the term of this patent is extended or adjusted under 35 U.S.C. 154(b) by 134 days.

(21) Appl. No.: 13/510,996

(22) PCT Filed: May 24, 2010

(86) PCT No.: PCT/CN2010/073167
§ 371 (c)(1),
(2), (4) Date: May 21, 2012

(87) PCT Pub. No.: WO2010/148874
PCT Pub. Date: Dec. 29, 2010

(65) Prior Publication Data
US 2012/0275779 A1 Nov. 1, 2012

(30) Foreign Application Priority Data

Nov. 24, 2009 (CN) .......................... 2009 1 0224828

(51) Int. Cl.
*H04B 10/00* (2013.01)
*H04J 14/00* (2006.01)
(52) U.S. Cl.
USPC .................................................. 398/3; 398/2
(58) Field of Classification Search
CPC ............. H04J 14/0287; H04J 14/0291; H04J 14/0293; H04J 14/0295; H04J 14/0297
USPC ..................................................... 398/3–5, 2
See application file for complete search history.

(56) References Cited

U.S. PATENT DOCUMENTS 6,327,400 B1 * 12/2001 Harstead et al. ................. 385/22
6,701,085 B1 * 3/2004 Muller .............................. 398/4
(Continued)

FOREIGN PATENT DOCUMENTS

CN 1852058 A 10/2006
CN 101162949 A 4/2008
(Continued)

OTHER PUBLICATIONS

Younghun Joo et al. "1-Fiber WDM Self-Healing Ring With Bidirectional Optical Add/Drop Multiplexers"; IEEE Photonics Technology Letters, vol. 16,No. 2, February 2004, XP-002711688; See pp. 683-685.

(Continued)

*Primary Examiner* — Dalzid Singh
(74) *Attorney, Agent, or Firm* — Ling Wu; Stephen Yang; Ling and Yang Intellectual Property

(57) ABSTRACT

A method, system and apparatus for single-fiber bidirectional ring network protection are disclosed in the present invention, wherein, one working path ring between various nodes in the single-fiber bidirectional ring network shares one sharing protection channel using a set wavelength, and when a fault occurs in a working path between certain two nodes, the method includes: controlling sharing protection apparatuses of a receiving end node and a transmitting end node of the failed working path to switch from a primary port to a corresponding standby port, controlling an intermediate node in the sharing protection channel corresponding to the working path to enable a standby port of the corresponding sharing protection apparatus, and establishing the sharing protection channel corresponding to the working path; transmitting a service signal carried in the failed working path through the newly established sharing protection channel.

11 Claims, 6 Drawing Sheets

(56) References Cited

U.S. PATENT DOCUMENTS

| | | | |
|---|---|---|---|
| 7,343,093 B2 * | 3/2008 | Oberg et al. | 398/3 |
| 7,433,593 B1 | 10/2008 | Gullicksen et al. | |
| 7,457,543 B2 * | 11/2008 | Aldridge et al. | 398/83 |
| 2002/0181037 A1 * | 12/2002 | Lauder et al. | 359/110 |
| 2005/0025489 A1 | 2/2005 | Aldridge et al. | |

FOREIGN PATENT DOCUMENTS

| | | | |
|---|---|---|---|
| EP | 977394 A2 * | 2/2000 | |
| EP | 1292055 A1 | 3/2003 | |

OTHER PUBLICATIONS

Xiaofeng Sun et al. "A Single-Fiber BI-Directional WDM Self-Healing Ring Network with Bi-Directional OADM for Metro-Access Applications"; IEEE Journal on Selected Areas in Communications, Vol. 25, No. 4, April 2007, XP-11181467A; See pp. 18-24.

International Search Report for PCT/CN2010/073167 dated Aug. 10, 2010.

* cited by examiner

METHOD, SYSTEM AND DEVICE FOR SINGLE-FIBER BIDIRECTIONAL RING NETWORK PROTECTION

TECHNICAL FIELD

The present invention relates to the field of optical communication technologies, and in particular, to a method, system and apparatus for single-fiber bidirectional ring network protection suitable for an Optical demultiplexer Multiplexing (WDM) system.

BACKGROUND OF THE RELATED ART

The optical communication technology is one of the fastest-growing technical fields at present, and the WDM technology is a preferred technology for implementing high-speed large-capacity data transmission in the optical communication network. With the development of the information industry and the growth of telecommunication services, the optical transmission network not only carries Internet services, but also is used as a bearer network for 3rd Generation Mobile Communications System (3G), Next Generation Network (NGN), Internet Protocol Television (IPTV), Virtual Private Network (VPN) and etc.

As a basis for carrying a variety of telecommunication services, the optical transmission network transmits a number of information, and once a fault occurs in a fiber channel of the optical transmission network or the optical transmission system fails, it is difficult to image how big the influence is and how serious the loss is, while on the other hand, in practical applications, it is difficult to avoid the fault in the network, and therefore, the protection for the optical transmission network is very necessary to the optical transmission network.

At present, most of the WDM systems belong to a double-fiber bidirectional ring network, which generally use protection modes of traditional 1+1 protection and 1:1 protection. In such two modes, each working path between every two nodes occupies one protection channel with a fixed wavelength. Therefore, it results in a number of wavelengths being occupied in the process of protection. While in areas where fiber resources are tight, it is general to use a single-fiber bidirectional ring network. If the protection modes of traditional 1+1 protection and 1:1 protection are used in the single-fiber bidirectional ring network, problems such as low resource availability etc. existing in the both protection modes will result in the fiber wavelength resources which are not abundant, becoming tighter.

As shown in FIG. 1, a diagram of a principle of using 1+1 protection and 1:1 protection in a single-fiber bidirectional ring network is illustrated, wherein, working paths are W1, W2, W3 and W4, and corresponding protection channels thereof are P1, P2, P3 and P4 respectively. As in the single-fiber bidirectional ring network, channels which are overlapped and intersected must use different wavelengths, the working paths W1 and W2 can use the same wavelength since they are neither overlapped nor intersected; however, as their protection paths are overlapped, W1 (W2), P1 and P2 at least need to occupy three different wavelengths; likewise, W3 (W4), P3 and P4 at least need to occupy three different wavelengths other than the wavelengths occupied by W1 (W2), P1 and P2. Thus, such mode needs to occupy many wavelength resources, especially when there are many services transmitted in the ring network, which will result in the wavelength resources being tighter.

SUMMARY OF THE INVENTION

Examples of the present invention provide a method, system and apparatus for single-fiber bidirectional ring network protection, which are used to solve a problem of low resource availability resulting in tight wavelength resources in existing single-fiber bidirectional ring network protection.

In order to solve the above problem, the technical scheme of the present invention is implemented as follows.

A method for single-fiber bidirectional ring network protection, wherein, working path rings between various nodes in the single-fiber bidirectional ring network share a sharing protection channel using a set wavelength, and when a fault occurs in a working path between two nodes in the sharing protection channel, the method comprises:

controlling sharing protection apparatuses of a receiving end node and a transmitting end node of the failed working path to switch from a primary port to a corresponding standby port, controlling an intermediate node in the sharing protection channel corresponding to the working path to enable a standby port of the corresponding sharing protection apparatus, and establishing the sharing protection channel corresponding to the working path;

transmitting a service signal carried in the failed working path through the newly established sharing protection channel.

The step of transmitting a service signal carried in the failed working path through the newly established sharing protection channel specifically comprises:

converting the service signal into a service signal with the set wavelength and transmitting through the standby port of the sharing protection apparatus of the transmitting end node;

after receiving the service signal and transponding the service signal at the set wavelength via standby ports of sharing protection apparatuses corresponding to various intermediate nodes, receiving the service signal through the standby ports of the sharing protection apparatuses of the receiving end node.

The method further comprises: determining a failed working path in the single-fiber bidirectional ring network and the transmitting end node and the receiving end node of the working path.

A system for single-fiber bidirectional ring network protection, comprises at least two nodes, a switching control apparatus and a sharing protection apparatus set in each node; a working path ring between two nodes sharing a sharing protection channel using a set wavelength; wherein, the switching control apparatus is configured to, when a fault occurs in a working path between two nodes, control sharing protection apparatuses of a receiving end node and a transmitting end node of the working path to switch from a primary port to a corresponding standby port, and control an intermediate node in the sharing protection channel corresponding to the working path to enable a standby port of the corresponding sharing protection apparatus;

the sharing protection apparatus is configured to establish the sharing protection channel corresponding to the failed working path by switching from a primary port of the working path to a corresponding standby port or enabling the standby port corresponding to the working path under control of the switching control apparatus.

The sharing protection apparatus is further configured to convert a service signal needed to be transmitted on the failed working path into a service signal with the set wavelength and then transmit the service signal with the set wavelength, or receive the service signal with the set wavelength on the working path, through its own standby port corresponding to the failed working path.

The switching control apparatus is further configured to determine the failed working path in the single-fiber bidirectional ring network and the transmitting end node and the receiving end node of the working path.

A switching control apparatus, comprises:

a protection determining unit, configured to determine a sharing protection apparatus of a sharing protection channel corresponding to a failed working path in various nodes of a single-fiber bidirectional ring network;

a control switching unit, configured to control the sharing protection apparatus to switch from a primary port to a corresponding standby port, and control an intermediate node in the sharing protection channel to enable the standby port of the sharing protection apparatus.

The apparatus further comprises:

a fault analyzing unit, configured to determine the failed working path in the single-fiber bidirectional ring network and the transmitting end node and the receiving end node of the working path.

An apparatus for single-fiber bidirectional ring network protection, comprises a sharing protection unit, a primary port, and a standby port; wherein, the primary port is configured to transmit and receive a service signal of a corresponding working path;

the standby port is configured to transmit and receive a service signal of a corresponding sharing protection channel;

the sharing protection unit is connected to the primary port and the standby port, and is configured to establish a sharing protection channel corresponding to the failed working path by switching from the primary port to the standby port under control of the a switching control apparatus or enabling the standby port of the sharing protection channel corresponding to the working path when a fault occurs in the working path of the single-fiber bidirectional ring network.

The primary port comprises a primary side optical transponder unit, configured to convert the service signal transmitted by the primary port into a service signal with a set wavelength of the corresponding working path, and transmit the service signal with the set wavelength;

the standby port comprises a standby side optical transponder unit, configured to receive the service signal of the corresponding sharing protection channel, or convert the service signal of the corresponding sharing protection channel into a service signal with the set wavelength, and transmit the service signal with the set wavelength.

The method, system and apparatus for single-fiber bidirectional ring network protection provided in the examples of the present invention implement one working path ring between various nodes in the single-fiber bidirectional ring network sharing one sharing protection channel using a set wavelength by controlling sharing protection apparatuses in a receiving end node, an intermediate node and a transmitting end node of a sharing protection channel corresponding to a failed working path to switch communication ports, when a fault occurs in a working path between certain two nodes in the single-fiber bidirectional ring network. The method can implement protection paths of multiple working paths only occupy one wavelength, thus avoiding the defect of a protection channel of each working path needing to occupy one wavelength in the related art, which largely saves the wavelength resources in the system.

PREFERRED EMBODIMENTS OF THE PRESENT INVENTION

The method for single-fiber bidirectional ring network protection provided in the examples of the present invention enables each working path between various nodes in the single-fiber bidirectional ring network to share one sharing protection channel by setting sharing protection apparatuses in the nodes, and enables all working paths between certain two nodes to operate using respective corresponding sharing protection channels by port switching of the sharing protection apparatuses set in various nodes when a fault occurs in a communication link between the two nodes, which implements the purpose of saving wavelength resources.

Figure 1:
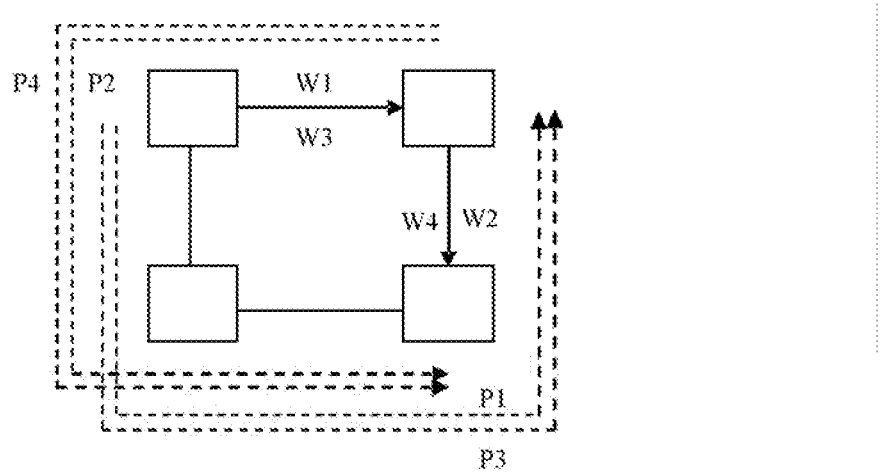
FIG. 1 is a diagram of a principle of ring network protection in the related art.
Figure 2:
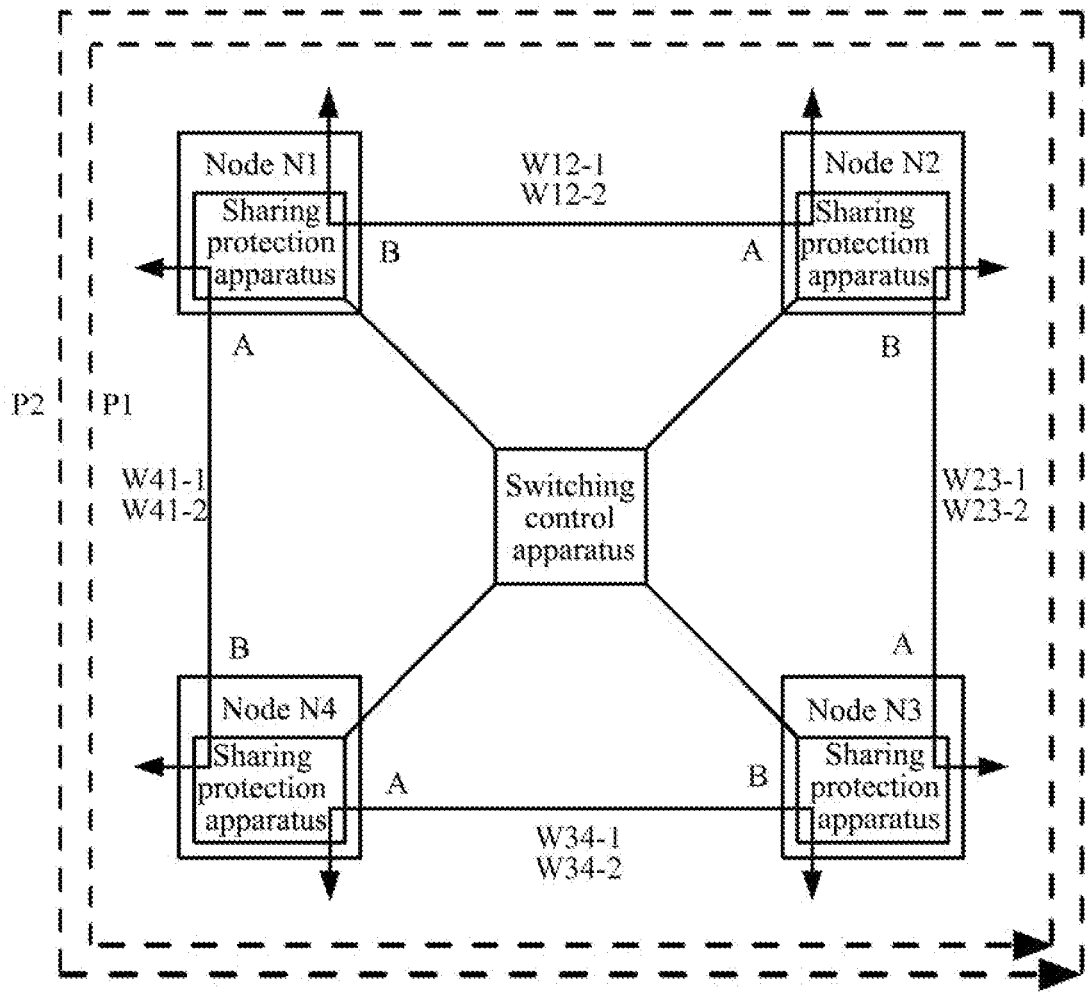
FIG. 2 is a structural diagram of a system for single-fiber bidirectional ring network protection according to an example of the present invention.

A structure of a system for implementing the above single-fiber bidirectional ring network protection is shown in FIG. 2, which comprises a number (at least two) of nodes, a switching control apparatus, and at least one sharing protection apparatus set in each node. Wherein, the switching control apparatus can be set independently as a separate device in the system, or can also be set in one node therein. FIG. 2 is by example of the single-fiber bidirectional ring network including four nodes, i.e., N1, N2, N3 and N4.

The above switching control apparatus is configured to control sharing protection apparatuses of a receiving end node and a transmitting end node of the failed working path (i.e., the receiving end node and the transmitting end node of the sharing protection channel corresponding to the failed working path) to switch from a primary port to a corresponding standby port when a fault occurs in a working path between certain two nodes, and control an intermediate node in the sharing protection channel corresponding to the working path to enable a standby port of the corresponding sharing protection apparatus.

The above switching control apparatus is further configured to determine the failed working path in the single-fiber bidirectional ring network and the transmitting end node and the receiving end node of the working path.

The sharing protection apparatus is configured to establish the sharing protection channel corresponding to the failed working path by switching from a primary port of the failed working path to a corresponding standby port under the control of the switching control apparatus or enabling the standby port of the sharing protection channel corresponding to the working path. Specifically, the sharing protection apparatuses of the transmitting end node and the receiving end node switch from the primary port of the failed working path to the corresponding standby port under the control of the switching control apparatus, and sharing protection apparatus of other intermediate node of the sharing protection channel enables the corresponding standby port.

The above sharing protection apparatus is further configured to convert a service signal needed to be transmitted on the failed working path into a service signal with a preset wavelength and then transmit, or receive the service signal with the preset wavelength on the working path by its own standby port corresponding to the failed working path.

Take the above four nodes illustrated in FIG. 2 as an example, in a normal state, a service transmitted between two adjacent nodes of the single-fiber bidirectional ring network implements transmission of a signal through a working path corresponding to the service between two nodes. For example, FIG. 2 gives working paths W12-1 and W12-2 between nodes N1 and N2, working paths W23-1 and W23-2 between nodes N3 and N4, working paths W34-1 and W34-2 between nodes N3 and N4, working paths W41-1 and W41-2 between nodes N4 and N1, and so on. Of course, there can also be reverse working paths between every two nodes, which will not be listed one by one here. In the present application, one working path ring in the single-fiber bidirectional ring network is made to share one sharing protection channel by setting sharing protection apparatuses, wherein, the working paths can be combined randomly, and are preset. For example, working paths W12-1, W23-1, W34-1 and W41-1 compose one working path ring, and use one sharing protection channel, for example, a protection channel P1 illustrated in the figure. W12-2, W23-2, W34-2 and W41-2 compose one working path ring, and use one sharing protection channel, for example, a protection channel P2 illustrated in the figure.

Figure 3:
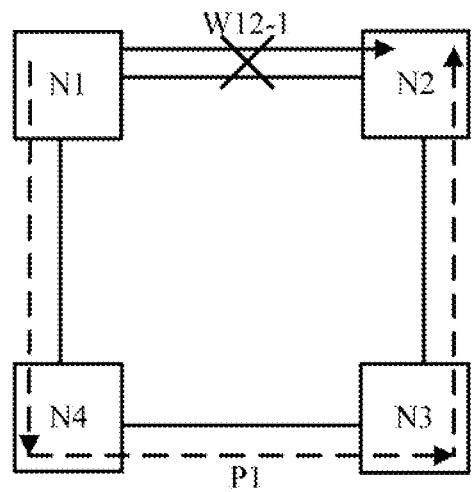
FIG. 3 is a diagram of a failed working path in a single-fiber bidirectional ring network according to an example of the present invention.

When a fault occurs in a communication link between certain two nodes, enabling of sharing protection channels corresponding to various working paths between the fault nodes is implemented by switching working states of the sharing protection apparatuses. For example, when a fault occurs between N1 and N2, a service signal transmitted on the working path W12-1 is transmitted through the protection channel P1, as shown in FIG. 3, which is a diagram of switching a service signal of the working path W12-1 onto the protection channel P1 for transmission when a fault occurs between N1 and N2. Likewise, a service signal transmitted on the working path W12-2 is transmitted through the protection channel P2. When a fault occurs between N3 and N4, a service signal transmitted on the working path W34-1 is transmitted through the protection channel P1, a service signal transmitted on the working path W34-2 is transmitted through the protection channel P2; and it is the exact same analogy when a fault occurs between other nodes.

Figure 4:
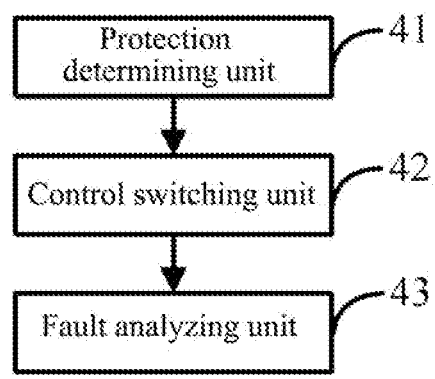
FIG. 4 is a structural diagram of a switching control apparatus according to an example of the present invention.

As shown in FIG. 4, a structure of the above switching control apparatus comprises a protection determining unit 41 and a control switching unit 42.

The protection determining unit 41 is configured to determine sharing protection apparatuses of sharing protection channels corresponding to failed working paths in various nodes of a single-fiber bidirectional ring network The control switching unit 42 is configured to control sharing protection apparatuses of a transmitting end node and a receiving end node of the determined sharing protection channel to switch from a primary port to a corresponding standby port, and control an intermediate node in the sharing protection channel to enable the standby port of the determined sharing protection apparatus.

The structure of the above switching control apparatus further comprises a fault analyzing unit 43, configured to determine the failed working path in the single-fiber bidirectional ring network and the transmitting end node and the receiving end node of the working path.

Figure 5:
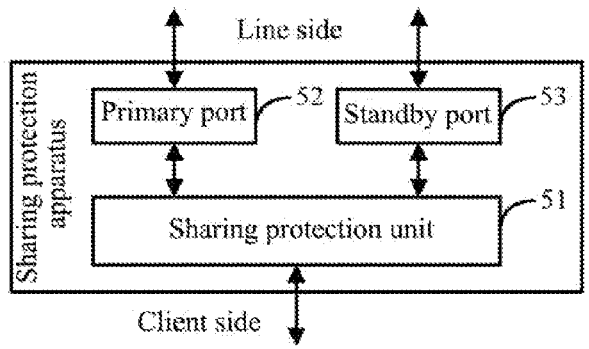
FIG. 5 is a structural diagram of a sharing protection apparatus according to an example of the present invention.

As shown in FIG. 5, a structure of the above sharing protection apparatus comprises a sharing protection unit 51, a primary port 52, and a standby port 53. Both the primary port and the standby port of the sharing protection apparatus are communication ports of optical waves at a line side, and are connected to a optical demultiplexer unit and a optical multiplexer unit respectively, to implement receiving and transmitting of a service signal at the line side. In addition, the sharing protection apparatus can also implement information interaction with a client side through a communication port at the client side.

The sharing protection unit is connected to the primary port 52 and the standby port 53, and is configured to establish a sharing protection channel corresponding to the failed working path by switch from the primary port to the standby port under the control of the a switching control apparatus or enabling the standby port of the sharing protection channel corresponding to the working path when a fault occurs in the working path of the single-fiber bidirectional ring network. Whether the ports are switched or the standby port is enabled directly is also determined according to whether the sharing protection apparatus is located in the transmitting end node, the receiving end node or the intermediate node of the sharing protection channel.

The primary port 52 is configured to transmit and receive a service signal of a corresponding working path.

An optical converting unit is configured in the above primary port 52, which is configured to convert the service signal transmitted by the primary port 52 into a service signal with a set wavelength of the corresponding working path for transmission.

The standby port 53 is configured to transmit and receive a service signal of a corresponding sharing protection channel.

An optical transponder unit is configured in the above standby port 53, which is configured to receive the service signal of the corresponding sharing protection channel, or convert the service signal of the corresponding sharing protection channel into a service signal with the set wavelength for transmission.

In the above system for single-fiber bidirectional ring network protection, each sharing protection channel is composed of one sharing protection apparatus in each node and a transmission path with a set wavelength between various nodes. Thus, when there are a plurality of sharing protection channels, a plurality of sharing protection apparatuses need to be set in various nodes.

In actual applications, the optical transponder unit set in the primary port can be referred to as a primary side optical transponder unit, and the optical transponder unit set in the standby port can be referred to as a standby side optical transponder unit.

Figure 6:
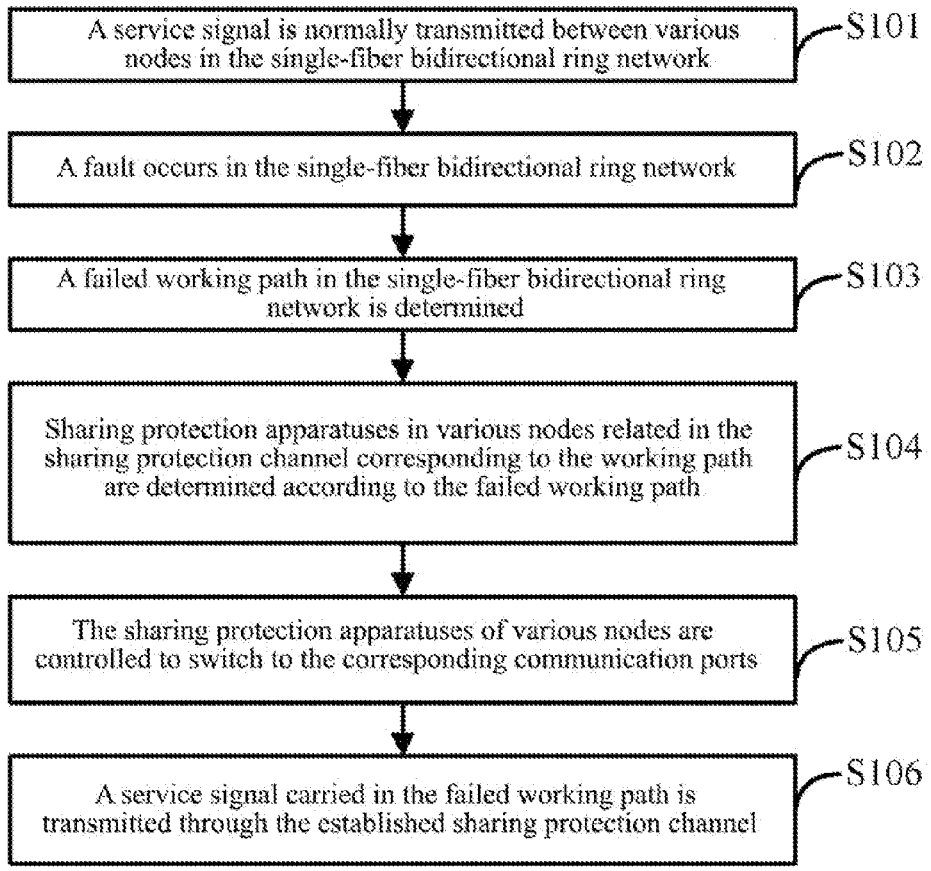
FIG. 6 is a flowchart of a method for single-fiber bidirectional ring network protection according to an example of the present invention.

The method for single-fiber bidirectional ring network sharing protection provided by examples of the present invention is based on the above principle, and the process thereof is as shown in FIG. 6, of which the implementation steps are as follows.

In step S101, a service signal is normally transmitted between various nodes in the single-fiber bidirectional ring network.

In a normal working state, various services transmit service signals through normal working paths thereof, and all sharing protection apparatuses in various nodes are in a normal working state. That is, various nodes perform information interaction with corresponding working paths using primary interfaces of respective sharing protection apparatuses, to transmit and receive service signals.

In step S102, a fault occurs in the single-fiber bidirectional ring network.

As there are a plurality of nodes in the single-fiber bidirectional ring network and there may be a plurality of working paths between every two nodes, there may be a plurality of working path rings in the whole single-fiber bidirectional ring network, and therefore, when a fault occurs, it needs to determine which working path(s) fails.

In step S103, a failed working path in the single-fiber bidirectional ring network and a transmitting end node and a receiving end node of the working path are determined.

After determining the failed working path, the transmitting end node and the receiving end node of the working path can be known.

When it is determined that a working path between certain two nodes in the single-fiber bidirectional ring network fails, the following steps are performed for each failed working path.

In step S104, sharing protection apparatuses in various nodes related in the sharing protection channel corresponding to the working path are determined according to the failed working path, which specifically comprises the following steps.

For the transmitting end node and the receiving end node, the sharing protection apparatus corresponding to the sharing protection channel of the failed working path is the sharing protection apparatus where the primary port to which the working path is connected is located.

For the intermediate node of the sharing protection channel, the sharing protection apparatus corresponding to the sharing protection channel of the failed working path is the sharing protection apparatus where a standby port of the sharing protection channel having a transmitted signal with a wavelength equal to that of a transmitted signal of corresponding standby port of the transmitting end node of the working path is located.

In step S105, the sharing protection apparatuses of various nodes are controlled to switch to the corresponding communication ports.

Sharing protection apparatuses of a receiving end node and a transmitting end node of the failed working path are controlled to switch from a primary port to a corresponding standby port, and an intermediate node in the sharing protection channel corresponding to the failed working path is controlled to enable a standby port of the corresponding sharing protection apparatus, to establish the sharing protection channel corresponding to the failed working path.

In step S106, a service signal carried in the failed working path is transmitted through the established sharing protection channel, which specifically comprises the following steps.

The service signal carried in the failed working path is converted into a service signal with a set wavelength of the corresponding sharing protection channel by a standby port of the sharing protection apparatus of the transmitting end node for transmission. The service signal with the set wavelength is received by a standby port of sharing protection apparatus corresponding to the receiving end node after the service signal is received via standby ports of corresponding sharing protection apparatuses in various intermediate nodes and transponded with the set wavelength.

Preferably, an optical transponder module is set in the primarily ports and the standby ports of the sharing protection apparatuses of various nodes. The conversion of the wavelength of the transmitted service signal is implemented through the optical transponder module.

The service signal transmitted on the corresponding working path is converted into a service signal with a set wavelength by optical transponder modules set in the primary ports of the sharing protection apparatuses in various nodes; and/or the service signal transmitted on the corresponding sharing protection channel is converted into a service signal with a set wavelength by optical transponder modules set in the standby ports of the sharing protection apparatuses in various nodes, and then the service signal with the set wavelength is transmitted.

The method and system for single-fiber bidirectional ring network sharing protection provided by the examples of the present invention will be described by a specific example hereinafter. First, directions when various nodes illustrated in FIG. 2 transmit services in the ring network are defined. Assume that the directions of the various nodes in the ring network are defined as that when a person stands in the ring and faces to the nodes, the left side is A direction and the right side is B direction, and the above working path W12-1 is a working path transmitting a service signal from the B direction of a N1 node to the A direction of a N2 node, and the above W23-1 is a working path transmitting a service signal from a B direction of the N2 node to the A direction of a N3 node, and so on. Under normal circumstances, there is a bidirectional service signal transmitted between various nodes.

Figure 7:
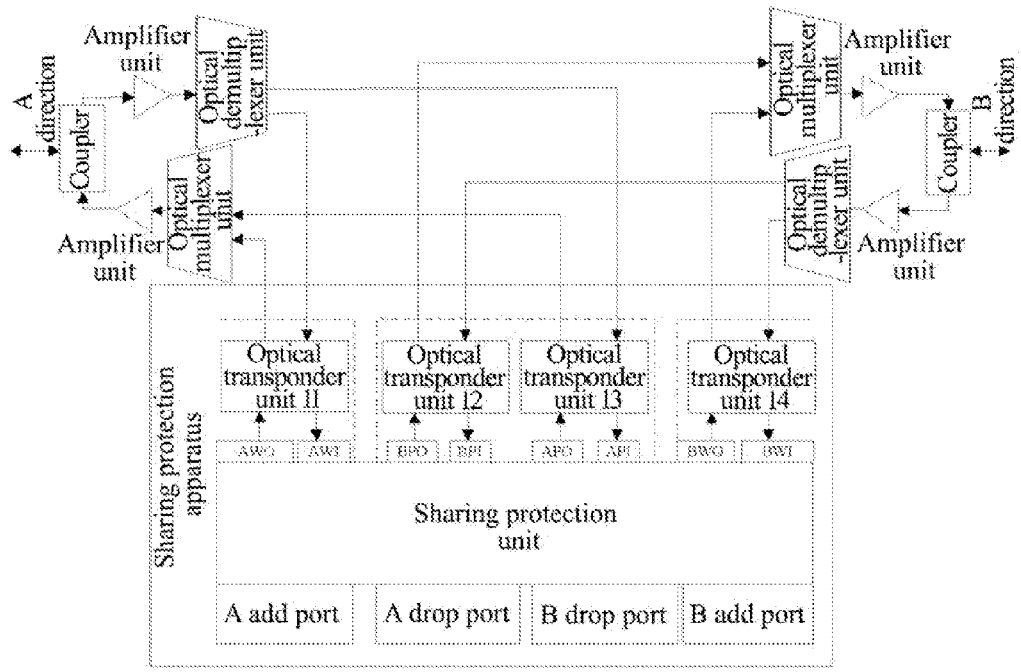
FIG. 7 is a structural diagram of a sharing protection apparatus according to an example of the present invention.

A specific structure of the above sharing protection apparatus illustrated in FIG. 5 is as shown in FIG. 7.

The sharing protection unit of the sharing protection apparatus can be a full optical system comprised of an optical switch and a coupler, or can be an electrical cross system.

The primary port of the sharing protection apparatus comprises an A directional communication port and a B directional communication port. Wherein, the A directional communication port comprises an optical transponder unit 11, an A directional Working Output (AWO) and an A directional Working Input (AWI); and the B directional communication port comprises an optical transponder unit 14, a B directional Working Output (BWO) and a B directional Working Input (BWI). Wherein, the optical transponder unit 11 and the optical transponder unit 14 can commonly compose the optical transponder module in the primary port.

The standby port of the sharing protection apparatus comprises an A directional protection port and a B directional protection port. Wherein, the B directional protection port comprises an optical transponder unit 12, a B directional Protection Output (BPO) and a B directional Protection Input (BPI); and the A directional protection port comprises an optical transponder unit 13, an A directional Protection Output (APO) and an A directional Protection Input (API). Wherein, the optical transponder unit 12 and the optical transponder unit 13 can commonly compose the optical transponder module in the standby port.

The above optical transponder units can convert an optical signal at a client side output by the sharing protection units into optical signal (service signal) at a line side with a particular wavelength, and meanwhile convert the optical signal at the line side into the optical signal at the client side. The above comprise four optical transponder units, which can implement outputting of optical signals with four different wavelengths at the line side.

In the sharing protection apparatus illustrated in FIG. 7, the A directional Working Input (AWI) and the A directional Protection Input (API) are connected to the A directional optical demultiplexer unit, and the optical demultiplexer unit performs optical demultiplexer on the service signals input by the coupler and an amplifier unit. The A directional Working Output (AWO) and the A directional Protection Output (APO) are connected to the A directional optical multiplexer unit, and outputting of the service signals is implemented through the amplifier unit and the coupler.

In the sharing protection apparatus illustrated in FIG. 7, the B directional Working Input (BWI) and the B directional Protection Input (BPI) are connected to the B directional optical demultiplexer unit. The B directional Working Output (BWO) and the B directional Protection Output (BPO) are connected to the B directional optical multiplexer unit, and outputting of the service signals is implemented through the amplifier unit and the coupler.

The communication ports at the client side of the sharing protection apparatus comprise an A add port, an A drop port, a B add port and a B drop port, all of which are connected to the sharing protection unit. The A add port is configured to transmit a service signal at the client side to the A direction line side, and the A drop port is configured to receive the service signal at the A direction line side after being processed by the sharing processing unit and provide it to the client side, the B add port is configured to transmit a service signal at the client side to the B direction line side, and the B drop port is configured to receive the service signal at the B direction line side after being processed by the sharing processing unit and provide it to the client side.

The A directional communication port, the B directional communication port, the A directional protection port and the B directional protection port of the above sharing protection apparatus are set separately, and in actual applications, two ports can be set together, and are connected to the corresponding optical demultiplexer unit and optical multiplexer unit.

In addition, in FIG. 7, the present invention is illustrated by example of a sharing protection apparatus. When a plurality of sharing protection apparatuses are set, all of various ports of A and B directions of the plurality of sharing protection apparatuses are connected to the optical multiplexer unit and the optical demultiplexer unit. The connection conditions are as described above.

The specific implementation process of performing protection on the single-fiber bidirectional ring network using the above sharing protection apparatus illustrated in FIG. 7 will be described in conjunction with FIG. 2 hereinafter.

Figure 8:
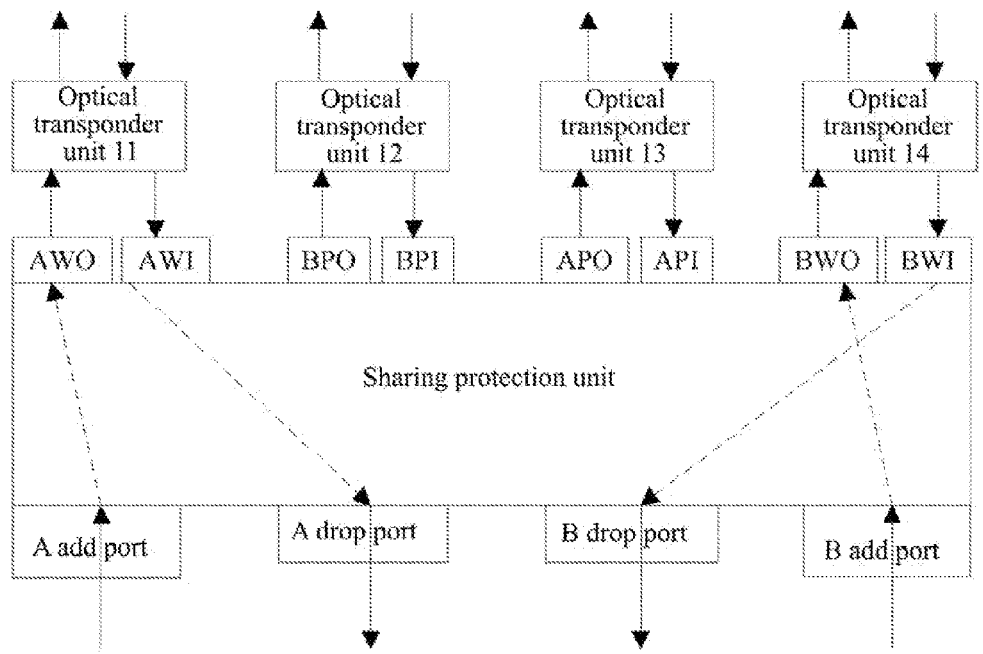
FIG. 8 is a diagram of a connection condition in a normal working state according to an example of the present invention.

When the single-fiber bidirectional ring network is in a normal working state, various nodes use respective primary ports to normally transmit service signals, and meanwhile, the connection state of the sharing protection apparatus is as shown in FIG. 8.

At this time, the A add port is connected to the A directional working output through the sharing protection unit, and the A drop port is connected to the A directional working input through the sharing protection unit. The B add port is connected to the B directional working output through the sharing protection unit, and the B drop port is connected to the B directional working input through the sharing protection unit. In a normal working state, the optical signals at the client side which are input by the A add port and the B add port are output by the A directional working output and the B directional working output respectively, after being processed by the sharing protection unit. At the same time, the received optical waves at the line side are input by the A directional working input and the B directional working input after passing through the optical transponder unit, and are transmitted to the corresponding A drop port and the B drop port for output after entering into the sharing protection unit and being processed by the sharing protection unit.

Take the working path W12-1 between the N1 and the N2 as an example, in a normal operation, the working W12-1 in the N1 node corresponds to the B directional working output, and occupies a $\lambda 4$ wavelength; and the protection channel thereof corresponds to the A directional protection output, and occupies a $\lambda 3$ wavelength. At the same time, the working path corresponding to the A directional working output occupies a $\lambda 1$ wavelength, and the protection channel thereof corresponds to the B directional protection output, and occupies a $\lambda 2$ wavelength.

The service signal using the working path W12-1 enters into the sharing protection unit from the B add port, and is output from the BWO and enters the optical transponder unit 14 after being processed by the sharing protection unit, and the service signal (optical signal) at the client side is forwarded into an optical signal at the line side with a wavelength being $\lambda 4$ by the optical transponder unit 14. Then, the optical wave at the line side with the $\lambda 4$ wavelength is combined with the optical waves at the line side with other wavelengths transmitted by other sharing protection apparatuses by the optical multiplexer unit and then enters into the amplifier unit for signal amplification, and finally passes through the coupler, and couples with wavelength-combined optical waves transmitted from the upstream into the same fiber, and is transmitted to a downstream node (i.e., the receiving end node N2).

The service signals entering from A direction of the receiving end node N2 specifically comprises the optical signal at the line side with the $\lambda 4$ wavelength (a wavelength-combined optical wave) passes through the coupler, and enters into the amplifier unit, which amplifies the optical signals, then the optical signals enter into the optical demultiplexer unit, which performs optical demultiplexer processing on the wavelength-combined optical waves, the optical wave at the line side with the $\lambda 4$ wavelength enters the optical transponder unit 11 after being output from the optical demultiplexer unit, and the wave transponder unit restores the optical wave at the line side with the $\lambda 4$ wavelength into the optical signal at the client side (the optical wave at the client side has no requirements on the wavelength, that is, the optical signal converted by the optical transponder unit 11 can no longer have the $\lambda 4$ wavelength), and finally, the optical signal at the client side is transmitted by the A drop port after being processed by the sharing protection unit.

When a fault occurs in the communication link between the N1 node and the N2 node in the single-fiber bidirectional ring network, the whole system is performed with a protection switching operation, and at this time, the service signal of the working path W12-1 originally occupying the $\lambda 4$ wavelength is switched into a corresponding sharing protection channel occupying the $\lambda 3$ wavelength. The service signal of the working path W12-1 between the N1 and the N2 is no longer transmitted by the N1 node to the N2 node directly, but is transmitted to the N2 node through a path of N1-N4-N3-N2. Of course, correspondingly, if there is a service signal in the working path W12-2, it is still transmitted through other nodes, i.e., being transmitted by the N2 node to the N1 node through a path of N2-N3-N4-N1.

Still take the working path W12-1 between N1 and N2 as an example (a path transmitting a service signal from the B direction of N1 to the A direction of N2), the sharing protection apparatus in various nodes corresponding to the working path performs port switching under the control of an switching control apparatus, such as Automatic Protection Switching (APS), i.e., the APS issues a switching command to various nodes, to instruct the corresponding sharing protection apparatus to perform port switching. All the sharing protection apparatuses in the N1, N2, N3 and N4 need to be switched.

Figure 9:
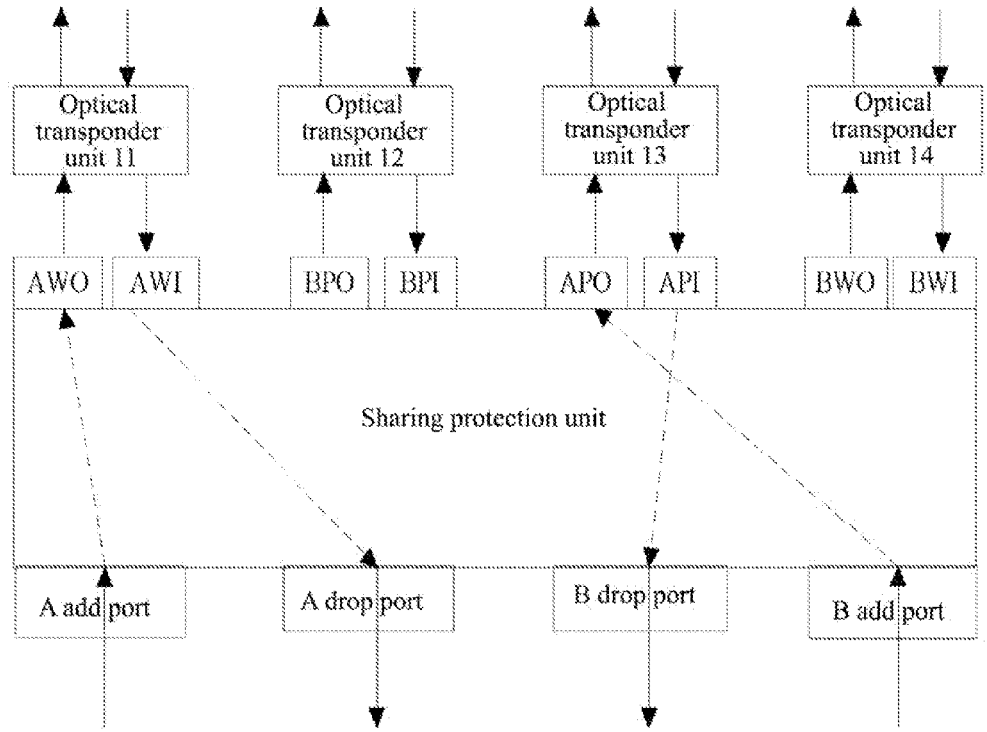
FIG. 9 is a diagram of a connection condition in a B directional switching state according to an example of the present invention.

Wherein, the corresponding sharing protection apparatus in the transmitting end node N1 is switched from a normal working state to a B directional switching state, as shown in FIG. 9.

At this time, the B add port is connected to the B directional working output, and is switched to be connected to the A directional protection output through the sharing protection unit; and the B drop port is connected to the B directional working input, and is switched to be connected to the A directional protection input through the sharing protection unit. In the normal working state, the optical signals at the client side input by the A add port and the B add port are output by the A directional working output and the A directional protection output respectively after being processed by the sharing protection unit; and at the same time, the received optical waves at the line side are input by the A directional working input and the A directional protection input after passing through the optical transponder unit, and are transmitted to the corresponding A drop port and the B drop port for output respectively after entering into the sharing protection unit and being processed by the sharing protection unit.

Take the W12-1 working path between the N1 and the N2 as an example. The optical signal at the client side of the service signal carried in the working path enters into the sharing protection unit via the B add port, and is output to the optical transponder unit 13 via the A directional protection input, and is converted into an optical signal at the line side with the λ3 wavelength by the optical transponder unit 13. Then, the optical wave at the line side with the λ3 wavelength are combined with the optical waves at the line side with other wavelengths transmitted by other sharing protection apparatuses by the optical multiplexer unit, and then enters into the amplifier unit for signal amplification, and finally passes through the coupler, and couples with wavelength-combined optical waves transmitted from the upstream into the same fiber, and is transmitted to a downstream node (i.e., the intermediate node N4).

Figure 10:
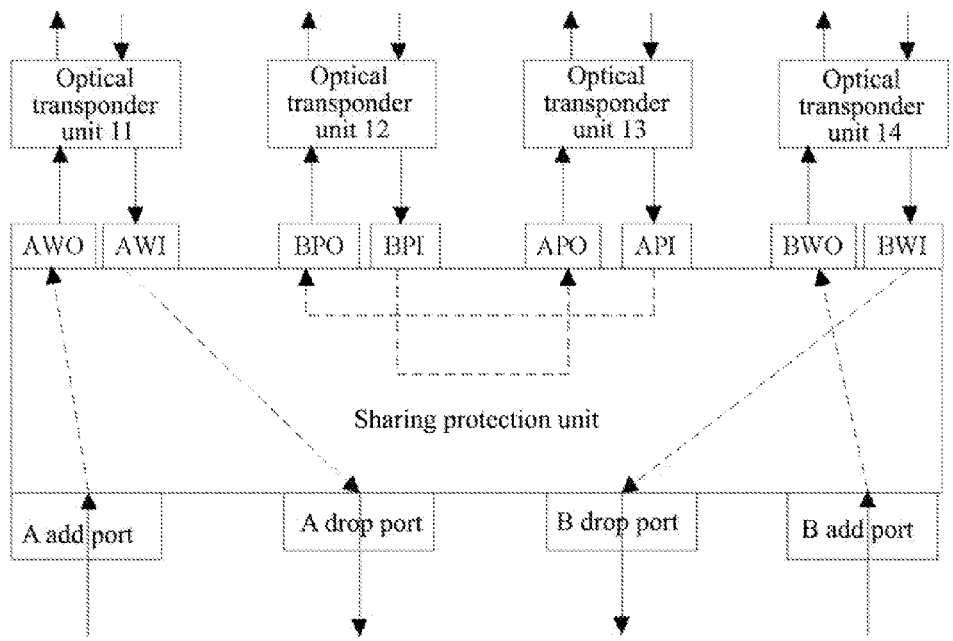
FIG. 10 is a diagram of a connection condition in a protection direct connection state according to an example of the present invention.

The corresponding sharing protection apparatuses in the intermediate nodes N3 and N4 are switched from a normal working state into a protection direct connection state, as shown in FIG. 10.

At this time, in addition to the A add port and the A directional working output, the A drop port and the A directional working input, the B add port and the B directional working output, and the B drop port and the B directional working input which are connected through the sharing protection unit, the intermediate nodes also enable the A directional protection port and the B directional protection port, wherein, the A directional Protection Input (API) is connected to the B directional Protection Output (BPO) through the sharing protection unit, and the B directional Protection Input (BPI) is connected to the A directional Protection Output (APO) through the sharing protection unit, for the service signal carried on the failed working path. The optical wave at the line side in the A directional sharing protection channel is received by the A directional Protection Input (API), and then is transmitted to the B directional Protection Output (BPO) through the sharing protection unit, and is converted into an optical wave at the line side with the corresponding wavelength by the B directional Protection Output (BPO) and then is transmitted; or the optical wave at the line side in the B direction is received by the B directional Protection Input (BPI), and then is transmitted to the A directional Protection Output (APO) through the sharing protection unit, and is converted into an optical wave at the line side with the corresponding wavelength by the A directional Protection Output (APO) and then is transmitted. For example, the sharing protection unit in a direct connection state, the BPI and the APO can be connected through optical switches.

Still take the working path W12-1 between N1 and N2 as an example. The N4 node receives a wavelength-combined optical wave transmitted by the N1 node, and the optical signal at the line side with the λ3 wavelength is converted into an optical signal at the client side through the optical transponder unit 12 after passing through the coupler, amplifier unit and the optical demultiplexer unit, and is transmitted to the optical transponder unit 13 through the B directional Protection Input (BPI), the sharing protection unit and the A directional Protection Output (APO), and the optical wave at the client side is converted into the optical signal at the line side with the λ3 wavelength by the optical transponder unit 13, and is transmitted to the downstream node (intermediate node N3) from the A directional output of the N4 node after being processed by the optical multiplexer unit, the amplifier unit and the coupler. The processing after the node N3 receives the optical signal at the line side of the Node 4 is the same as that in the N4 node, which implement transmission to the downstream node (receiving end node N2) thereof through the N3.

Figure 11:
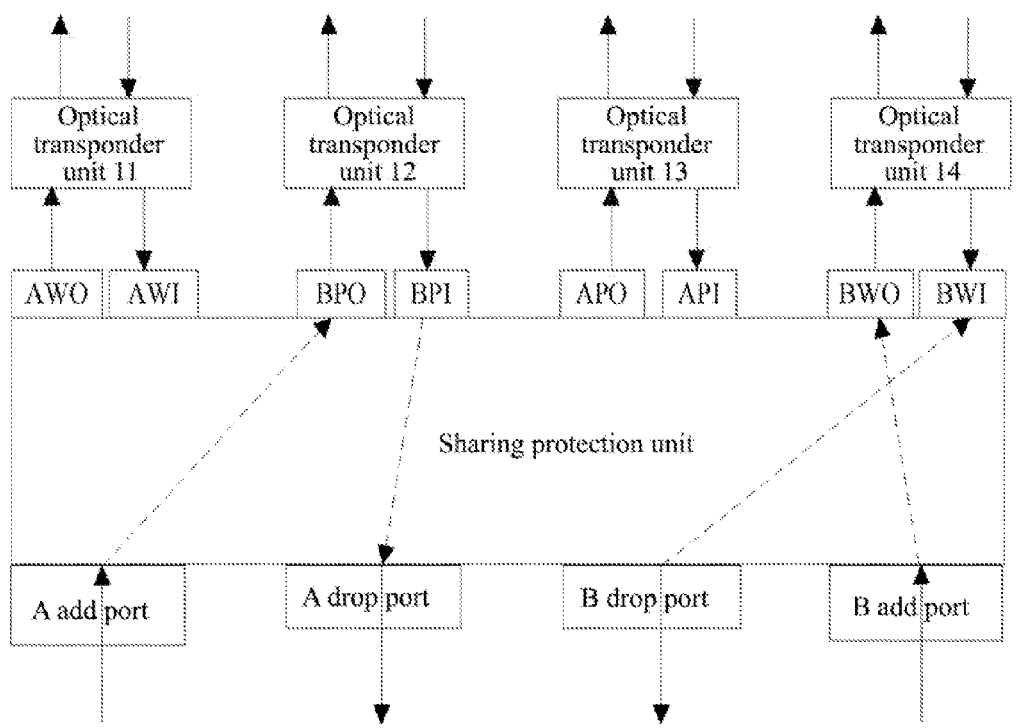
FIG. 11 is a diagram of a connection condition of an A directional switching state according to an example of the present invention.

The corresponding sharing protection apparatus in the receiving end node N2 switches from a normal working state to an A directional switching state, as shown in FIG. 11.

At this time, the A add port is connected to the A directional working output, and is switched to be connected to the B directional protection output through the sharing protection unit; and the A drop port is connected to the A directional working input, and is switched to be connected to the B directional protection input through the sharing protection unit. In the normal working state, the optical signals at the client side input by the A add port and the B add port are output by the B directional protection output and the B directional working output respectively after being processed by the sharing protection unit; and the same time, the received optical waves at the line side are input by the B directional protection input and the B directional working input after passing through the optical transponder unit, and are transmitted to the corresponding A drop port and the B drop port for output respectively after entering into the sharing protection unit and being processed by the sharing protection unit.

Take the W12-1 working path between the N1 and the N2 as an example. The N2 node receives a wavelength-combined optical wave transmitted by the N3 node, and the optical signal at the line side with the λ3 wavelength is converted into an optical signal at the client side through the optical transponder unit 12 after passing through the coupler, amplifier unit and the optical demultiplexer unit, and enters into the sharing protection unit through the B directional Protection Input (BPI), and is transmitted to the A drop port after being processed by the sharing protection unit, and then is transmitted from the A drop port, to implement transmission of a service signal of the working path W12-1 through the sharing protection channel.

Thus, the sharing protection unit illustrated in FIG. 7 can have four states, i.e., a normal working state (idle), an A processing switching state, a B directional switching state and protection direct connection, and the switching is implemented by the control of the APS.

There is strict requirement on the wavelength of the optical wave transmitted in the communication link in the single-fiber bidirectional ring network, and optical waves with the same wavelength cannot occur in the same optical fiber. The sharing protection system provided in the examples of the present invention flexibly controls the wavelengths of the signals transmitted in the working channel and the protection channel in the system effectively through the optical transponder unit when enabling one working path ring to share one sharing protection channel with a set wavelength, so that working wavelengths of the service signals of various working paths transmitted in the same fiber and the protection wavelengths of the service signals of various protection channels are different, thus ensuring the same wavelength not occurring in the same fiber, and satisfying the strict requirement of the single-fiber bidirectional ring network on the wavelength of the transmitted signal; at the same time, the wavelength resources are saved as much as possible, protection on the single-fiber bidirectional ring network is implemented, thus largely enhancing the resource availability of the system.

The above method and system implement sharing protection of a plurality of working path rings by setting a plurality of sharing protection apparatuses in one node, which is convenient to implement and has good applicability.

The above description is merely the specific embodiments of the present invention, and the protection scope of the present invention is not limited thereto, and in the technical scope disclosed by the present invention, changes, substitutions or applications to other similar apparatuses easily thought of by any skilled familiar with the technical field should be contained within the protection scope of the present invention. Therefore, the protection scope of the present invention should be based on the protection scope of the claims.

What is claimed is:

1. A method for single-fiber bidirectional ring network protection, characterized in that, working paths between various nodes in the single-fiber bidirectional ring network share a sharing protection channel using a set wavelength, and when a fault occurs in a working path between two nodes in the sharing protection channel, the method comprises:
   controlling sharing protection apparatuses of a receiving end node and a transmitting end node of the failed working path to switch from a primary port to a corresponding standby port, controlling an intermediate node in the sharing protection channel corresponding to the working path to enable a standby port of the corresponding sharing protection apparatus, and establishing the sharing protection channel corresponding to the working path;
   transmitting a service signal carried in the failed working path through the newly established sharing protection channel.

2. The method according to claim 1, wherein, the step of transmitting a service signal carried in the failed working path through the newly established sharing protection channel specifically comprises:
   converting the service signal into a service signal with the set wavelength and transmitting through the standby port of the sharing protection apparatus of the transmitting end node;
   after receiving the service signal and transponding the service signal at the set wavelength via standby ports of sharing protection apparatuses corresponding to various intermediate nodes, receiving the service signal through the standby ports of the sharing protection apparatuses of the receiving end node.

3. The method according to claim 2, further comprising: determining a failed working path in the single-fiber bidirectional ring network and the transmitting end node and the receiving end node of the working path.

4. The method according to claim 1, further comprising: determining a failed working path in the single-fiber bidirectional ring network and the transmitting end node and the receiving end node of the working path.

5. A system for single-fiber bidirectional ring network protection, comprising at least two nodes, a switching control apparatus and a sharing protection apparatus set in each node; a working path ring between two nodes sharing a sharing protection channel using a set wavelength; wherein,
   the switching control apparatus is configured to, when a fault occurs in a working path between two nodes, control sharing protection apparatuses of a receiving end node and a transmitting end node of the working path to switch from a primary port to a corresponding standby port, and control an intermediate node in the sharing protection channel corresponding to the working path to enable a standby port of the corresponding sharing protection apparatus;
   the sharing protection apparatus is configured to establish the sharing protection channel corresponding to the failed working path by switching from a primary port of the working path to a corresponding standby port or enabling the standby port corresponding to the working path under control of the switching control apparatus.

6. The system according to claim 5, wherein, the sharing protection apparatus is further configured to convert a service signal needed to be transmitted on the failed working path into a service signal with the set wavelength and then transmit the service signal with the set wavelength, or receive the service signal with the set wavelength on the working path, through its own standby port corresponding to the failed working path.

7. The system according to claim 6, wherein, the switching control apparatus is further configured to determine the failed working path in the single-fiber bidirectional ring network and the transmitting end node and the receiving end node of the working path.

8. The system according to claim 5, wherein, the switching control apparatus is further configured to determine the failed working path in the single-fiber bidirectional ring network and the transmitting end node and the receiving end node of the working path.

9. A switching control apparatus, comprising:
   a protection determining unit, configured to determine a sharing protection apparatus of a sharing protection channel corresponding to a failed working path in various nodes of a single-fiber bidirectional ring network;
   a control switching unit, configured to control the sharing protection apparatus to switch from a primary port to a corresponding standby port, and control an intermediate node in the sharing protection channel to enable the standby port of the sharing protection apparatus.

10. The apparatus according to claim 9, further comprising:
   a fault analyzing unit, configured to determine the failed working path in the single-fiber bidirectional ring network and the transmitting end node and the receiving end node of the working path.

11. An apparatus for single-fiber bidirectional ring network protection, comprising a sharing protection unit, a primary port, and a standby port; wherein,
- the primary port is configured to transmit and receive a service signal of a corresponding working path;
- the standby port is configured to transmit and receive a service signal of a corresponding sharing protection channel;
- the sharing protection unit is connected to the primary port and the standby port, and is configured to establish a sharing protection channel corresponding to the failed working path by switching from the primary port to the standby port under control of the a switching control apparatus or enabling the standby port of the sharing protection channel corresponding to the working path when a fault occurs in the working path of the single-fiber bidirectional ring network;
- the primary port comprises a primary side optical transponder unit, configured to convert the service signal transmitted by the primary port into a service signal with a set wavelength of the corresponding working path, and transmit the service signal with the set wavelength; and
- the standby port comprises a standby side optical transponder unit, configured to receive the service signal of the corresponding sharing protection channel, or convert the service signal of the corresponding sharing protection channel into a service signal with the set wavelength, and transmit the service signal with the set wavelength.

* * * * *